Jan. 17, 1950 M. J. PIFER 2,495,020
SELECTOR FOR SIGNAL SEEKING TUNING SYSTEMS
Filed April 19, 1944
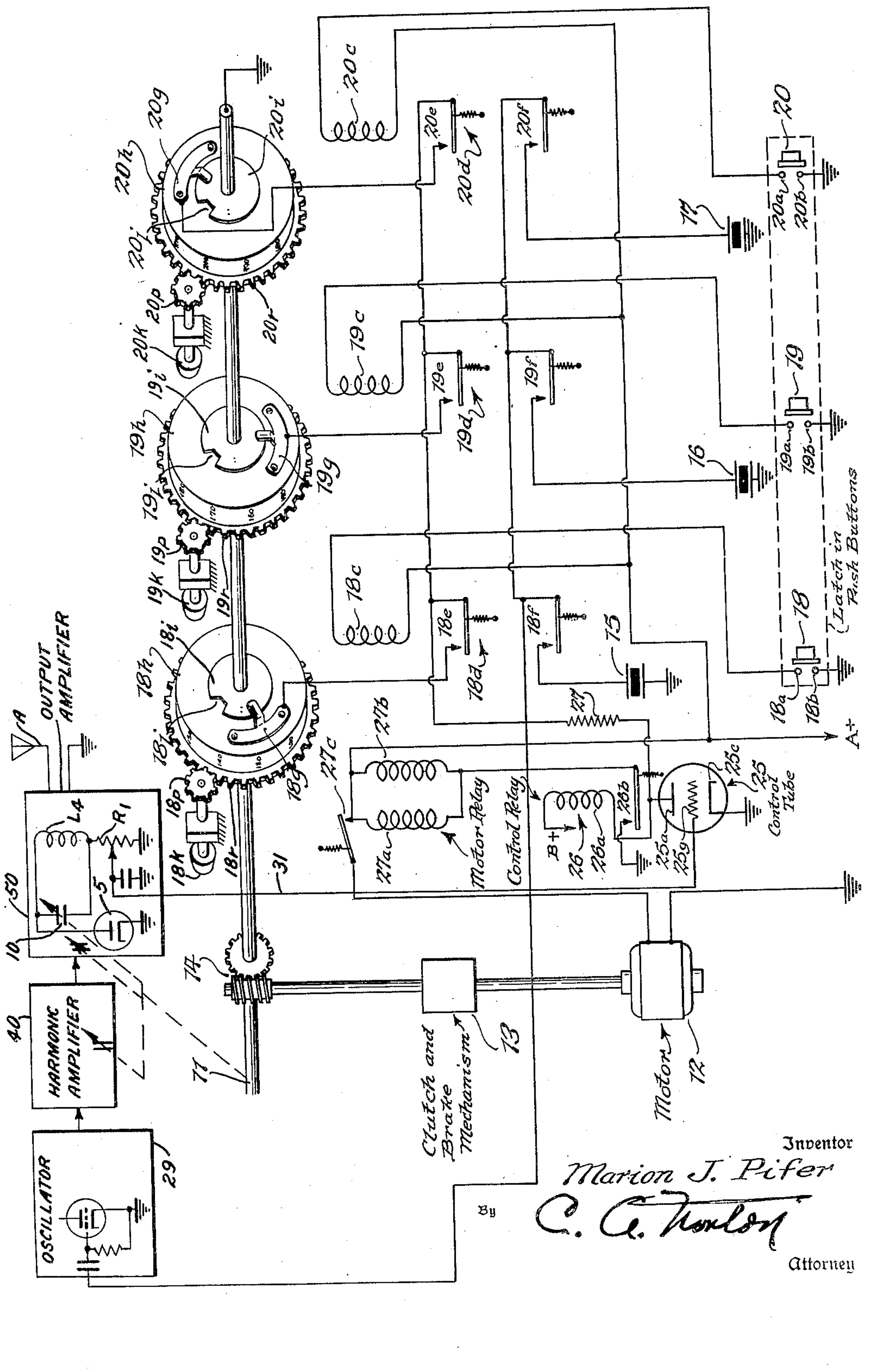
Inventor
Marion J. Pifer
By C. A. Norton
Attorney Patented Jan. 17, 1950 2,495,020

UNITED STATES PATENT OFFICE 2,495,020

SELECTOR FOR SIGNAL SEEKING TUNING SYSTEMS

Marion J. Pifer, Williamsville, N. Y., assignor to Colonial Radio Corporation, Buffalo, N. Y.

Application April 19, 1944, Serial No. 531,738

10 Claims. (Cl. 250—40)

This invention relates to electric automatic tuning circuits, and more particularly to improvements in circuits of the type disclosed and claimed in a co-pending application of William S. Winfield, Serial No. 463,775.

In the reference application there is disclosed an automatic tuning circuit in which the tuning instrumentality, such as a variable condenser, is driven by an electric motor. When the tuned circuit reaches resonance, which, for example, may be determined by a piezoelectric crystal associated with the circuit, the resonant voltage developed may be applied as a control voltage to a control tube to operate a series of relays which open the motor circuit and stop the tuning variation. If it were desired to employ such a system with a large number of channels, each crystal controlled for tuning accuracy, the number of crystals required and the cost of the crystals might become excessive.

In accordance with my invention, I am able to very considerably reduce the number of crystals required by utilizing at will any one of the harmonic frequencies of a number of crystals. However, if this were all that were done, the apparatus would still be inconvenient and slow to operate because the apparatus would tune to each harmonic of the crystal in use at which a voltage developed. In accordance with my in-invention, I provide means whereby the operator may select not only the particular crystal to be utilized, but also the harmonic of particular crystal, to the exclusion of others. Thus, considering a crystal from which the 11th to 18th harmonics are available for tuning, I may, for example, select any one of these harmonics so that when the particular crystal is used, the apparatus will always tune to a selected harmonic, i. e., the 13th, 14th, 15th or whatever other harmonic frequency may have been selected.

Also, I provide means by which the operator may select which of these harmonics he will employ at any particular time. Thus by using only three crystals the fundamental frequencies of which are different, and, each of which has 8 usable harmonics and selecting one at a time, the operator has a choice of 24 possible channels which he may utilize, it being understood, of course, that the apparatus may be so set that only three channels will be available at particular previously made adjustments, it being necessary to adjust for the harmonic frequency to be used in case it is desired to change from one harmonic of a crystal to a different one of the same crystal.

Accordingly, among the objects of my invention may be mentioned the following:

To provide an automatic tuning apparatus in which with appropriate preliminary adjustment, a considerably greater number of channels are available for use than the number of crystals employed.

To provide a system of the class described in which a number of preselectable channels may be available from each individual crystal.

To provide apparatus in which any particular harmonic frequency of any particular crystal employed may be utilized for automatic tuning control.

Still other objects and advantages of my invention will be apparent from the specifications.

In this application I have particularly pointed out and distinctly claimed the part, improvement, or combination which I claim as my invention or discovery, and I have explained the principles thereof and the best mode in which I have contemplated applying those principles, so as to distinguish my invention from other inventions.

The single figure in the drawing is a circuit diagram of automatic tuning apparatus in accordance with my invention. While the invention has utility in either a radio receiver or transmitter, the invention is shown for purposes of illustration as embodied in a transmitter arrangement of the type represented by Figure 3 of the aforementioned Winfield application. This transmitter includes a multiple-crystal oscillator 29 having an oscillator tube 30 indicated as one of the triode type having a control grid 30$g$. The output circuit of the oscillator 29 is coupled through a tunable harmonic amplifier 40 to a tunable output amplifier 50 which in turn is coupled to an antenna A.

Referring more particularly to the tuning control system used in the transmitter, 10 represents one of several unicontrolled tuners of any suitable type operated from shaft 11. The tuner 10 is shown as a variable condenser included with an inductor $L_4$ in a tuned circuit which may comprise one of the tunable resonant circuits of the carrier-wave signal-translating channel of the amplifier 50 or a tunable circuit coupled to the signal-translating channel. The shaft 11 may in turn be driven by electric motor 12 through combined clutch and brake mechanism 13 and gearing 14. The oscillator 29 has its frequency controlled by any one of the various crystals to be employed, such as 15, 16, and 17, by connection of the same to the grid 30$g$ of the oscillator tube 30 in the well-known manner.

For purposes of simplicity, I have shown only 3 crystals, and circuits for controlling them, but it will be understood that as many crystals may be employed as are desired, and, as will be understood, the crystal sockets are preferably adapted to receive crystals of different frequency so that the apparatus may be readily adapted to different frequencies by the substitution of other crystals.

The apparatus lends itself very well to push-button control, and in the arrangement shown I have indicated 3 pushbuttons, 18, 19, and 20, for selection of the crystal to be employed by connecting each crystal selectively to the grid 30*g* of the oscillator tube 30; thus, depression ot button 18 will establish crystal 15 as the control, button 19 crystal 16, and button 20 crystal 17. In case more crystals are employed, an additional pushbutton may be used for each additional crystal. The pushbuttons will preferably be of the well-known latch-in type, so that when one is depressed, it will remain in depressed position until another is pushed. Pushing of the second one releases the first and locks the second one in until another is pushed, and so on.

Actuation of pushbutton 18, for example, closes a circuit from ground through contacts 18*a* and 18*b* of the pushbutton, thence through the actuating winding 18*c* of relay 18*d* and to a suitable source of potential, herein indicated as A+. Similarly, pushing button 19 opens the circuit of the pushbutton previously closed and closes the circuit through contacts 19*a* and 19*b* of pushbutton 19 through the energizing winding 19*c* of relay 19*d* to A+. Pushing pushbutton 20 opens the previous circuit and closes the circuit through contacts 20*a*, and 20*b* through the energizing winding 20*c* of relay 20*d* to A+.

Each of the relays preferably comprises an upper and lower set of contacts. Thus relay 18*d* has upper contacts 18*e* and lower contacts 18*f*. Relay 19*d* has upper contacts 19*e* and lower contacts 19*f*, and relay 20*d* has upper contacts 20*e* and lower contacts 20*f*. The lower contacts connect the ungrounded side of the respective crystals to the gride 30*g* of the oscillator 30. Thus relay contacts 18*f* when closed, connect the crystal 15 to the grid 30*g* of the oscillator 30, relay contacts 19*f* connect crystal 16 to the grid of the oscillator, and relay contacts 20*f* connect crystal 17 to the grid of the oscillator.

It may now be understood that when push-button 18, for example, is depressed, the energizing winding 18*c* will be energized and the lower contacts 18*f* will be closed, connecting crystal 15 to the oscillator grid 30*g*. Also, the upper contacts 18*e* will be closed preparing a circuit which will now be described.

The control tube is indicated as at 25, having a cathode 25*c*, control grid 25*g*, and anode 25*a*. The cathode 25*c* may be connected to ground, the control electrode 25*g* connected through conductor 31 to a suitable point on a load resistor $R_1$ of a rectifier tube 5 which with the resistor $R_1$ is coupled across the resonant circuit 10, $L_4$ to have applied thereto the resonant voltage which is developed when the circuit is in tune, and the anode 25*a* on the one hand through the actuating winding 26*a* of relay 26, having operating contacts 26*b*, to B+.

From the anode of tube 25 a connection may extend through resistor 27 through the upper contacts 18*e* of relay 18*d*, and to one contact 18*g* on setting wheel 18*h*. This wheel may be conveniently supported upon shaft 11 for rotation about the latter, but it is not driven by shaft 11 and is preferably so mounted as to be frictionally retained in the angular position where it is set by manual actuation of a knob 18*k* which is coupled through a pinion 18*p* to a ring gear 18*r* carried by the wheel 18*h*. The purpose of this manual angular adjustment of the wheel 18*h*, and similarly of the wheels 19*h* and 20*h*, will be hereafter explained.

The contact 18*g* bears upon a contacting segment 18*i* secured and connected to the shaft 11 and rotatable therewith, carrying on its periphery a notch 18*j*. This is preferably a wiping contact of the type used in wave change switches, and cooperates with the contact 18*g* in a manner so that the circuit is closed between 18*g* and 18*i* at all times except when the notch 18*j* is passing through the projecting fingers extending from 18*g*.

The circuit which includes the upper contacts 19*e* of relay 19*d* may pass through similar switch elements 19*g* and 19*i* mounted on wheel 19*h*, which may be constructed and mounted like wheel 18*h*, and similarly the circuit through the upper contacts 20*e* of relay 20*d* may pass through similar contacts 20*g* and 20*i* on wheel 20*h*, similarly arranged.

Tube 25 may be the control tube of the system, and is preferably so arranged that the plate current normally flowing therethrough, when no negative bias is applied to its grid, is sufficient to hold the contacts 26*b* closed, thereby energizing the motor relay coils 27*a* and 27*b* and closing the contacts 27*c* in the motor circuit. The coils 27*a* and 27*b*, which are separately shown in the drawing for purposes of clarity may be and preferably are a part of the clutch and brake mechanism indicated at 13.

The energizing circuit of the motor relay 27*b* may be traced from +A to the top ends of coils 27*a* and 27*b*, thence through those coils in parallel, thence through relay contacts 26*b* when closed, thence to ground, and when no negative bias is applied to the tube 25 by the rectifier system 5,$R_1$, the motor contacts 27*c* will be closed and the motor will operate, changing the tuning.

Assuming pushbutton 18 to be depressed, when a resonant voltage develops in the resonant circuit 10,$L_4$ due to the translation by the amplifier 50 of a harmonic frequency of the oscillations generated by the oscillator 29 and is applied to the rectifier 5, a negative bias is developed across the resistor $R_1$ and is applied to the grid 25*g* of the control tube 25, substantially reducing the plate current in tube 25, and relay contacts 26*b* open, provided the switch on wheel 18*h* is open. If, however, the notch 18*j* is not between the fingers on 18*g*, this switch will be closed, and it will be seen that this switch is effectively in parallel with the control tube 25 insofar as the operation of relay 26 is concerned; that is, the plate current of tube 25 may go to zero, but relay 26 will not open if the switch on wheel 18*h* is closed, because relay 26 is held closed by current flowing from B+ through winding 26*a*, resistance 27, contacts 18*d* and 18*e*, now closed, switch 18*g* and 18*i* to ground. Similarly, the switches on wheels 19*h* and 20*h* are effectively in parallel with tube 25, but neither of these is operative unless its corresponding button 19 or 20 is depressed.

This will hold the motor circuit 10,$L_4$ closed, and the motor will continue to operate unless the circuit tunes to a resonant frequency at a time when the switch on wheel 18*h* is open.

From this it will be understood that a particular crystal harmonic frequency may be set up for crystal 15 by tuning the tuner 10 manually to resonate the circuit 10,$L_4$ to the desired crystal harmonic and then adjusting wheel 18h by manipulation of the knob 18k until the notch 18j falls between the fingers on 18g with the circuit tuned to the desired crystal harmonic. If this is done for the various crystal harmonics, the dial may then be calibrated so that it may be set manually by the calibration appearing upon it, to select a particular harmonic frequency, and the same may, of course, be done for the wheels 19h and 20h, and for any additional wheels controlling additional crystals. Thereafter, the tuning may be controlled by the pushbuttons. If at any time it is desired to reset the circuit for a different harmonic of one or more crystals, the corresponding wheel may be reset manually to the frequency desired, as indicated by the calibrations.

While I have shown and described certain preferred embodiments of my invention, it will be understood that modifications and changes may be made without departing from the spirit and scope of my invention, as will be apparent to those skilled in the art.

I claim:

1. In an automatic tuning system, in combination, a tuner, power driven means for varying said tuner, a thermionic tube having a relay in its output circuit for interrupting variation of tuning in response to the development of resonant voltage therein, a series of push buttons each for selecting a particular frequency channel for operation, and means associated with each push button for rendering said tube inoperative to stop the variation of tuning except over a predetermined relatively narrow portion of the tuning range of said tuner including the channel to be selected by the respective push button, said last mentioned means comprising a shaft rotatable with said tuner, and a plurality of circuit controlling members on said shaft spaced longitudinally thereof, said circuit controlling members being angularly adjustable on said shaft to permit change of the frequency channel to be selected by a particular push button.

2. The combination claimed in claim 1, in which each of said circuit controlling members is a two-part rotary switch having one member fixedly secured to said shaft, and the other surrounding said shaft, and adjustable angularly thereon.

3. In an automatic tuning system, in combination, a tuner, power driven means for varying said tuner continuously and repeatedly with a scanning action over a tuning spectrum thereof, a thermionic tube having a relay in its output circuit for controlling the energization of said power driven means to interrupt variation of tuning in response to the development of resonant voltage in a resonant circuit including said tuner, a piezoelectric crystal for establishing at least one frequency at which said resonant voltage may be developed in said resonant circuit, and an auxiliary control system including adjustable means for controlling the energization of said power driven means independently of said tube except over a small portion of the tuning spectrum of said tuner the position of said portion within said spectrum being established by selective adjustment of said adjustable means.

4. In an automatic tuning system, in combination, a tuner, power driven means for varying said tuner continuously and repeatedly with a scanning action over a tuning spectrum thereof, a thermionic tube having a relay in its output circuit for controlling the energization of said power driven means to interrupt variation of tuning in response to the development of resonant voltage in a resonant circuit including said tuner, a piezoelectric crystal for establishing at least one frequency at which said resonant voltage may be developed in said resonant circuit, and an auxiliary control system including a manually presettable switch for controlling the energization of said power driven means independently of said tube except over a small portion of the tuning spectrum of said tuner, the position of said portion within said spectrum being established by selective adjustment of said adjustable means.

5. In an automatic tuning system, in combination, a tuner, power driven means for varying said tuner continuously and repeatedly with a scanning action over a tuning spectrum thereof, a first control system including a thermionic tube and a relay having a solenoid included in a space-current circuit of said tube for controlling the energization of said power driven means to interrupt variation of tuning in response to the development of resonant voltage in a resonant circuit including said tuner, a piezoelectric crystal for establishing at least one frequency at which said resonant voltage may be developed in said resonant circuit, and an auxiliary control system including adjustable means for supplying current to said solenoid through a conductive path independent of said space-current circuit of said tube for controlling the energization of said power driven means independently of said tube except over a small portion of the tuning spectrum of said tuner, the position of said portion within said spectrum being established by selective adjustment of said adjustable means.

6. In an automatic tuning system, in combination, a tuner, power driven means for varying said tuner continuously and repeatedly with a scanning action over a tuning spectrum thereof, a thermionic tube having a relay in its output circuit for controlling the energization of said power driven means to interrupt variation of tuning in response to the development of resonant voltage in a resonant circuit including said tuner, a plurality of piezoelectric crystals for establishing the frequencies at which said resonant voltage may be developed in said resonant circuit, and an auxiliary control system including a manually presettable switch corresponding to each of said crystals for controlling the energization of said power driven means independently of said tube except over a plurality of small portions of the tuning spectrum of said tuner, the position of each of said portions within said spectrum being individually established by selective adjustment of an individual one of said switches.

7. In an automatic tuning system, in combination, a tuner, power driven means for varying said tuner continuously and repeatedly with a scanning action over a tuning spectrum thereof, a thermionic tube having a relay in its output circuit for controlling the energization of said power driven means to interrupt variation of tuning in response to the development of resonant voltage in a resonant circuit including said tuner, a plurality of piezoelectric crystals for establishing the frequencies at which said resonant voltage may be developed in said resonant circuit, means for selecting the one of said crystals to be energized during a selected operating interval, and an auxiliary control system including a manually presettable switch corresponding to each of said crystals for controlling the energization of said power driven means independently of said tube except over a plurality of small portions of the tuning spectrum of said tuner, the position of each of said portions within said spectrum being individually established by selective adjustment of an individual one of said switches.

8. In an automatic tuning system, in combination, a tuner, power driven means for varying said tuner continuously and repeatedly with a scanning action over a tuning spectrum thereof, a thermionic tube having a relay in its output circuit for controlling the energization of said power driven means to interrupt variation of tuning in response to the development of resonant voltage in a resonant circuit including said tuner, a piezoelectric crystal for establishing at least one frequency at which said resonant voltage may be developed in said resonant circuit, and an auxiliary control system including adjustable means having an element moving synchronously with said tuner for controlling the energization of said power driven means independently of said tube except over a small portion of the tuning spectrum of said tuner, the position of said portion within said spectrum being established by selective adjustment of said adjustable means.

9. In an automatic tuning system, in combination, a tuner, power driven means for varying said tuner continuously and repeatedly with a scanning action over a tuning spectrum thereof, a thermionic tube having a relay in its output circuit for controlling the energization of said power driven means to interrupt variation of tuning in response to the development of resonant voltage in a resonant circuit including said tuner, a piezoelectric crystal for establishing at least one frequency at which said resonant voltage may be developed in said resonant circuit, and an auxiliary control system including a switch structure having a first switch element moving synchronously with said tuner and a second switch element angularly presettable with relation to said first switch element for controlling energization of said power driven means independently of said tube except over a small portion of the tuning spectrum of said tuner, the position of said portion within said spectrum being established by selective adjustment of said second switch element.

10. In an automatic tuning system, in combination, a tuner, power driven means for varying said tuner continuously and repeatedly with a scanning action over a tuning spectrum thereof, a thermionic tube having a relay in its output circuit for controlling the energization of said power driven means to interrupt variation of tuning in response to the development of resonant voltage in a resonant circuit including said tuner, a plurality of piezoelectric crystals for establishing the frequencies at which said resonant voltage may be developed in said resonant circuit, and an auxiliary control system including a plurality of longitudinally spaced rotary switches each including a first switch element moving synchronously with said tuner and a second switch element angularly presettable with relation to said first switch element for controlling the energization of said power driven means independently of said tube except over small portions of the tuning spectrum of said tuner, the position of each of said portions within said spectrum being individually established by selective adjustment of individual ones of said second switch elements.

MARION J. PIFER.

REFERENCES CITED

The following references are of record in the file of this patent:

UNITED STATES PATENTS

| Number | Name | Date |
|---|---|---|
| 1,727,575 | Trogner | Sept. 10, 1929 |
| 1,792,276 | Chubb | Feb. 10, 1931 |
| 1,861,371 | Trogner | May 21, 1932 |
| 1,917,995 | Polin | July 11, 1933 |
| 2,025,218 | Reinken | Dec. 24, 1935 |
| 2,056,200 | Lowell | Oct. 6, 1936 |
| 2,098,331 | Bowman | Nov. 9, 1937 |
| 2,099,719 | Banning, Jr. | Nov. 23, 1937 |
| 2,182,352 | Prochnow | Dec. 5, 1939 |
| 2,218,905 | Cooper | Oct. 22, 1940 |
| 2,297,618 | Grimes et al. | Sept. 29, 1942 |
| 2,326,738 | Andrews | Aug. 17, 1943 |
| 2,382,203 | Chandler | Aug. 14, 1945 |

Certificate of Correction

January 17, 1950

Patent No. 2,495,020

MARION J. PIFER

It is hereby certified that errors appear in the printed specification of the above numbered patent requiring correction as follows:

Column 2, line 16, for the word "specifications" read *specification*; line 33, strike out "one"; column 3, line 15, for "ot" before "button" read *of*; column 4, line 70, strike out "$10,L_4$" and insert the same after "circuit" in line 72, same column; and that the said Letters Patent should be read with these corrections therein that the same may conform to the record of the case in the Patent Office.

Signed and sealed this 15th day of August, A. D. 1950.

[SEAL]

THOMAS F. MURPHY,
*Assistant Commissioner of Patents.*